United States Patent
Giera et al.

(10) Patent No.: US 11,301,893 B2
(45) Date of Patent: Apr. 12, 2022

(54) TARGETED CONTENT DELIVERY, PLAYBACK, AND TRACKING

(71) Applicant: NCR Corporation, Atlanta, GA (US)

(72) Inventors: Steven Jarrett Giera, Dacula, GA (US); Samantha Elaine Maida, Atlanta, GA (US); Steve Patrick McEvoy, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 33 days.

(21) Appl. No.: 16/409,430

(22) Filed: May 10, 2019

(65) Prior Publication Data
US 2020/0357017 A1 Nov. 12, 2020

(51) Int. Cl.
G06Q 30/02 (2012.01)
G06F 16/48 (2019.01)
G06Q 20/18 (2012.01)
G06Q 20/20 (2012.01)

(52) U.S. Cl.
CPC ......... *G06Q 30/0242* (2013.01); *G06F 16/48* (2019.01); *G06Q 30/0268* (2013.01); *G06Q 20/18* (2013.01); *G06Q 20/20* (2013.01)

(58) Field of Classification Search
CPC . G06Q 30/0242; G06Q 30/0268; G06F 16/48
See application file for complete search history.

(56) References Cited

U.S. PATENT DOCUMENTS

| | | | |
|---|---|---|---|
| 2007/0132660 A1* | 6/2007 | Nuttall | G07F 13/025 345/2.3 |
| 2011/0161160 A1* | 6/2011 | Carlson | G06F 3/013 705/14.41 |
| 2011/0226854 A1* | 9/2011 | Stoudt | G07F 13/00 235/380 |
| 2011/0282727 A1* | 11/2011 | Phan | H04L 65/4084 705/14.36 |
| 2014/0012658 A1* | 1/2014 | Argue | 705/14.42 |
| 2016/0148181 A1* | 5/2016 | Prosperie, III | G07F 13/025 705/16 |
| 2016/0379261 A1* | 12/2016 | Avalos | G06Q 30/0261 705/14.58 |

OTHER PUBLICATIONS

"Marketing at the Pump" (Reill, Howard, Nov. 7, 2017; published online at https://cstoredecisions.com/2017/11/07/marketing-at-the-pump/) (Year: 2017).*

\* cited by examiner

*Primary Examiner* — James M Detweiler
(74) *Attorney, Agent, or Firm* — Schwegman, Lundberg & Woessner (57) ABSTRACT

A presence of a consumer transacting at a transaction terminal is detected. Content for the transaction terminal is played as media on the transaction terminal. When an identity of the consumer is resolved, the content is switched to new content that is targeted/customized to the consumer and is played as new media on the transaction terminal. When a transaction concludes, the media play is stopped. Statistics for the transaction and media play are retained for tracking and reporting.

19 Claims, 4 Drawing Sheets

TARGETED CONTENT DELIVERY, PLAYBACK, AND TRACKING

BACKGROUND

Enterprises are continually looking to technology to meaningfully engage their customers for purposes of improving revenues and customer loyalty. Businesses now reach their customers through a variety of different technology channels, such as voice, web browser, text, mobile applications (apps), kiosks, and text messaging. Even if a small percentage of these business contacts with their customers is successful, businesses can substantially improve revenues and brand recognition with their customers.

One area where consumers are known to be stationary and susceptible to engagement is while the consumers are refueling their vehicles. The consumer must wait at the pump while the vehicle is being refueled, which means the consumer is known to be present at a single location for an extended period of time and is known to be purchasing a particular product, namely fuel. Usually, the consumer is also located at a store that sells convenience items.

Recognizing these facts, businesses have installed displays capable of playing multimedia at the fuel pumps for purposes of engaging potential customers of the businesses and capturing the attention of the consumers while the consumers wait for their vehicle to finish fueling. Typically, these displays play a predesignated media playlist that is unrelated to the particular consumer that is refueling his/her vehicle. Furthermore, the media file is generally on a continuous loop and may be synchronized with other pump displays regardless as to whether other consumers are at those pumps. As a result, these approaches have not proven to be very successful in engaging consumers and most consumers view these media files as background noise paying little attention to the advertisements.

SUMMARY

In various embodiments, methods and a system for targeted content delivery, playback, and tracking are presented.

According to an embodiment, a method for targeted content delivery, playback, and tracking is presented. A notice of a presence of a consumer at a transaction terminal is received and content associated with the transaction terminal is obtained. The content is delivered to the transaction terminal for playing on a display of the transaction terminal while the consumer conducts a transaction at the transaction terminal.

DETAILED DESCRIPTION

Figure 1:
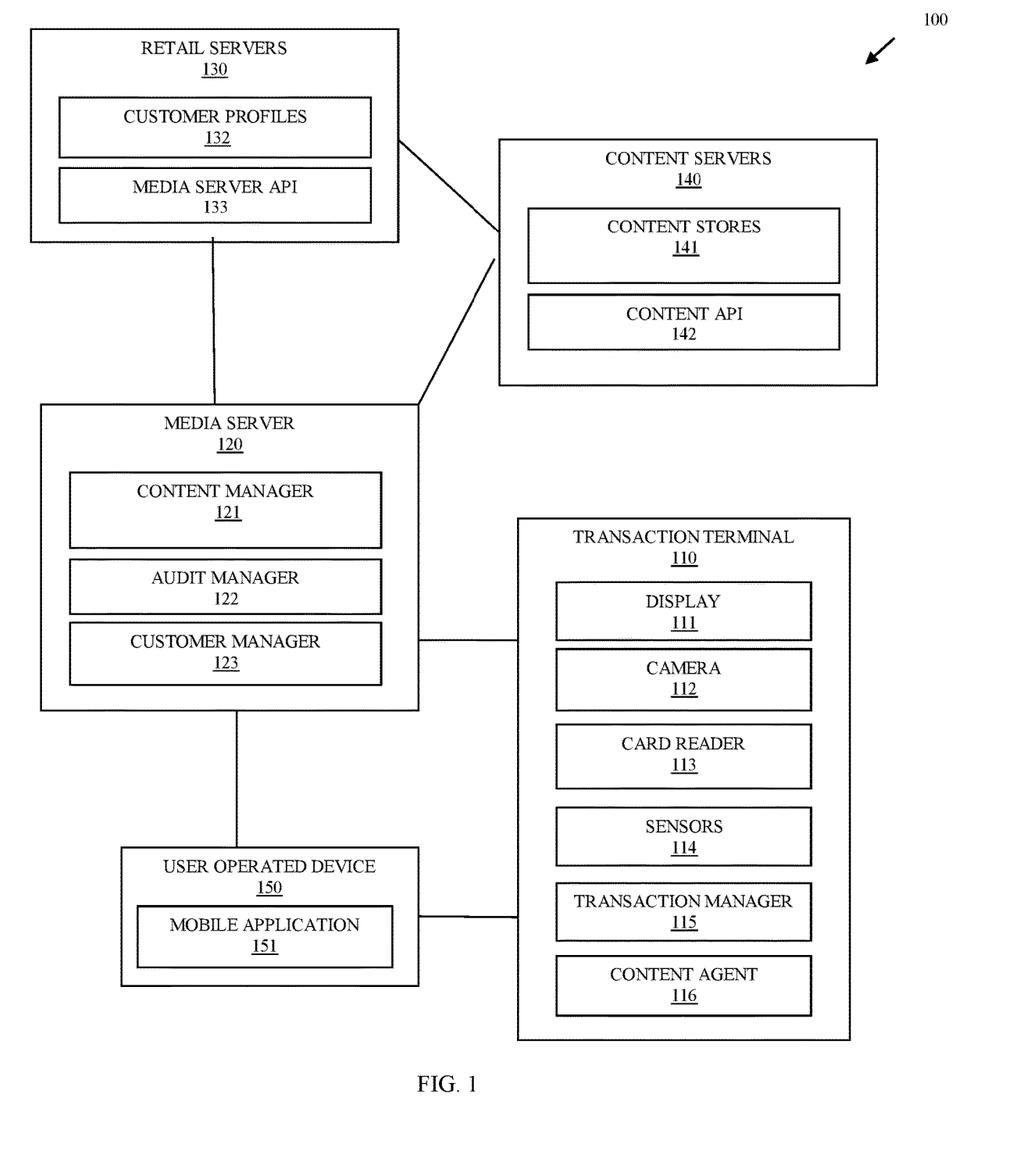
FIG. 1 is a diagram of a system for targeted content delivery, playback, and tracking, according to an example embodiment.

FIG. 1 is a diagram of a system 100 for targeted content delivery, playback, and tracking, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the techniques of targeted content delivery, playback, and tracking, presented herein and below.

As used herein and below, the terms "customer," and "consumer," "user" may be used interchangeably and synonymously.

As used herein a "fuel pump" of "fuel pump kiosk" includes an outdoor payment terminal (OPT) that mounts as an independent device inside of a fuel pump.

The system 100 includes a transaction terminal 110, a media server 120, retail servers 130, content servers 140, and optionally, a user-operated device 150.

The transaction terminal 110 includes a processor and non-transitory computer-readable storage media having executable instructions. Additionally, the transaction terminal 110 includes or is associated with a display 111, a camera 112, a card reader 113, sensors 114, a transaction manager 115, and a content agent 116. The executable instructions represent the transaction manager 115 and the content agent 116. The processor executes the executable instructions from the non-transitory computer-readable storage medium for purposes of performing the processing discussed below with respect to the transaction manager 115 and the content agent 116.

The media server 120 includes a processor and non-transitory computer-readable storage media. Moreover, the media server 120 includes a content manager 121, an audit/tracking manager 122, and a customer manager 123. The executable instructions represent 121-123 and the processor executes the executable instructions from the non-transitory computer-readable storage medium for purposes of performing the processing discussed below with respect to 121-123.

The retail servers 130 include a processor and non-transitory computer-readable storage media. Also, the retail servers 130 include customer profiles 132 and a media server API 133. The executable instructions represent 132-133 and the processor executes the executable instructions from the non-transitory computer-readable storage medium for purposes of performing the processing discussed below with respect to 123-133.

The content servers 140 include a processor and non-transitory computer-readable storage media. Further, the content servers include content stores 141 having multimedia files (audio, graphics, video, animations, etc.) and a content API 142. The executable instructions represent the content API 142 and the processor executes the executable instructions from the non-transitory computer-readable storage medium for purposes of performing the processing discussed below with respect to content API 142.

The system 100 for targeted content delivery, playback, and tracking will now be discussed with reference to the above-noted devices and components.

Initially, the media server API 133 is used to define selections of media content and associate the media content with attributes or demographic consumer segment profiles. The media server API 133 provides the media content and the associated profiles to the customer manager 123. Each demographic profile may be linked to one or more media content selections. The media content selections may identify a particular media file (title, reference link, unique identifier, etc.) or may describe media attributes (content subject matter, content associated with a given product or server, video, animation, surveys, audio, etc.).

In an embodiment, the media server API 133 may also define generic profiles for specific media selections based on geographic location, store identifier, current calendar date, time of day, terminal identifiers, and other information. The generic profiles along with the linked media selections (or media attributes) are also provided to the content manager 121.

A user-facing interface provided from the media server 120 to the retail servers 130 (such as a browser-based interface) may allow analyst of retailers to provide the profiles and media selections/media attributes, the user-facing interface using or interfaced to the media server API 133. Also, the API 133 may interact with internal retail interfaces or applications to receive the profiles and media selections/media attributes, which the API 133 provides to the content manager 121. So, initial definition of or acquisition of the profiles and media selections/media attributes can be through manual interaction of the user-facing interface operated by an analyst and/or automated processing through application interactions.

The media server API 133 may also provide with each media content and/or demographic/generic profile one or more identifiers that are associated with specific marketing campaigns, products, and/or services of a given retailer associated with the retail server 130. These identifiers may be used by the retailer to track and associate each profile and/or media selection (as is discussed more completely below). The content manager 123 can associate each demographic profile and media selection pairing with a given retailer based on a retailer identifier provided by the media server API 133.

The content manager 121 may interact with the content API 142 to pre-acquire the media selections based on the media attributes or specific media content selections provided by the media server API 133. The content API 142 obtains the media selections conforming to the media attributes and/or references to specific media content selections from the content stores 141 and sends the media content selections to the media server 120.

In an alternative or an additional case, the content manager 121 may dynamically and in real time interact with the content API 142 to obtain specific media content selections when a customer is identified as being present at the transaction terminal 110 for a transaction. So, the media selections may be pre-acquired before a customer is detected at the transaction terminal 110 and/or dynamically acquired when a customer is identified at the transaction terminal 110.

The content agent 116 reports a presence of a customer at the transaction terminal 110 to the customer manager 123. This can be done in a variety of manners. For example, an event raised by the card reader 113 may indicate that a customer payment card was read by the card reader 113 (this can be through a card swipe, card tap, or contactless (wireless) reading of the customer payment card by the card reader 113—the wireless can be reading card details from the user-operated device 140 (such as when the card is in a mobile wallet on device 140)). In another instance, an image of the front of the transaction terminal 110 taken by the camera 112 may be processed to raise an event indicating that a person is standing in front of the transaction terminal 110. In another case, sensors 114 (motion—movement detected—lifting of a fuel pump from its holster; keyboard key pressed; soft-key associated with a touchscreen display 111 that is pressed; keys/buttons that are generated within an interface associated with the display 111; light—beam of light is broken; sound (such as through a microphone, etc. detecting audio, etc.) may raise an event that is associated with a person being present at the transaction terminal 110.

The content agent 116 reports the presence of a customer at the terminal 110 to the customer manager 123. In an embodiment, the content manager 121 may immediately send a media selection back to the content agent 116. The selection is determined based on a general profile associated with the transaction terminal 110, such profile may include the physical location of the terminal 110, current date, current time, store identifier associated with the terminal 110, and other information. The agent 116 then causes the targeted media selection to be played on display 111 through a media player of terminal 110.

It is important to note that at a given enterprise/store associated with the terminal 110 there may be a plurality of transaction terminals 110, and the system 100 only plays targeted and directed media content selections (based on the generic profile) when a customer's presence is detected at that specific terminal 110. This is different than conventional approaches were generic and non-targeted content is played on all available terminals.

It is also important to note that when the target media selection, provided by the content manager 121 to the content agent 116, is played on display 111, an identity of the actual customer at the terminal 110 is unknown. That is, the customer remains and anonymous customer that is associated with the generic profile associated with the terminal 110 or store having terminal 110.

At some point during the transaction at the terminal 110, data may be obtained by the content agent 116 that permits the identity of the customer to be discovered. This can include data obtained in a variety of manners during the transaction, such as a loyalty account, name, phone number, entered by the customer using a touchscreen display 111 or provided through a card read by the card reader 113. The transaction manager 115 may report the name and/or account number to the agent 116. It may also be that mobile application 151 uses location services of device 150 and reports device location information to customer manager 123, which coincides with the location of terminal 110. Assuming the customer has authorized and provided registered biometric data, the agent 116 may sample pixels from an image of the customer's face taken by camera 112 and provide those pixels to manager 123. The manager 123 then hashes the pixel values and matches it to a registered profile for the customer to identify the customer. It is noted that manager 123 may also just relay the pixels to the API 133, and a retailer-specific application resolves the identity of the customer.

The manager 123 provides the in-transaction data collected for an identity of the customer by the agent 116 to the API 133. The API 133 searches customer profiles or accounts 132 and locates an identity for the customer that matches the in-transaction data collected. The account of the customer may be linked to a specific media selection, a specific demographic profile, or specific media attributes. The API 133 returns the specific media selection, profile, or attributes to the content manager 121. If the content manager 121 has the media selection defined for that customer, then that media selection is sent from the content manager 121 to the agent 116. If the needed media selection is not pre-cached on media server 120, the content manager 121 obtains the needed media selection in real time from content API 142 and provides back to agent 116 in real time. Also, as content data associated with the needed media selection is received by content manager 121 it may be piped and streamed directly to agent 116 to reduce latency. Content agent 116 may buffer the content data as received and provide to the media player for playing on display 111.

A variety of streaming, buffering, and piping techniques can be deployed by content manager 121, agent 116, and the media player to improve network bandwidth and reduce latency of media selections being played on display 111.

The media selection played on display 111 is targeted and delivered for a specific customer identity when the transaction data provides enough transaction data that the customer identity can be identified. The actual customer identity and data information remain under the control of the retail server 130 and is obtained only as needed by the customer manager 123. As far as the customer manager 123 is concerned, the customer is associated with an identifier and a linked profile or media selection. This prevents any personal information associated with a customer in a customer account 132 from being exposed on any network wire during the processing. All that is exposed is a customer identifier (known to the retailer) and a retailer assigned profile.

As media selections are played through the media player on the display 111 by agent 116, the agent 116 maintains a log of data. This data can include: a media identifier, calendar date, time of day, terminal identifier, store identifier, geographical location, profile identifier, retailer identifier, customer identifier (if determined as discussed above), any retailer assigned identifier provided with the profile (such as marketing campaign identifier, product identifier, service identifier), transaction identifier, and transaction details for the transaction as provided by the transaction manager 115. This log of data is provided from the agent 116 back to the audit manager 122.

The audit manager 122 may provide through API 133 an interface to retail server 130 for purposes of searching, defining reports, generating report schedules, and dynamically reporting the data captured in logs by agent 116 and maintained by audit manager 122. The audit manager 122 may also provide a web-based interface to retail accounts that is accessible to retail employees through mobile devices, tablets, desktops, etc.

Furthermore, agent 116 may also capture in the log data when the customer interacts with the targeted media selection for purposes of acquiring more information about a product or service associated with the targeted media selection or for purposes of purchasing the product or service. That is, the media selection may include a web-based interface that allows the customer to access a web-site of the retailer and view and/or purchase the product or service. When such actions are taken, the browser includes cookies and history that is accessible to agent 116 for purposes of capturing such information in the log of data.

In an embodiment, the API 133 returns a phone number retrieved with a matched customer identity along with an offer that was associated with the customer or that server 130 determined to provide the customer based on the transaction. The offer may then be sent as a text message by customer manager 123 to user device 150 or may then be sent by the retail server 130 directly to mobile application 151 of user device 150. The offer may be provided to the customer while the customer is transacting at the terminal 110 or shortly after notice is received that the transaction concluded.

Additionally, the targeted media selection may include an offer to the consumer, such that by selecting on touchscreen display 111 the offer, the offer is sent to mobile application 151, emailed to an email address registered to the customer, and/or texted to user device 150.

The audit manager 122 may also maintain statistics about the media selections, such as number of times played, duration of play time, calendar days played, day-of-week played, time-of-day played, etc. The statistics can be aggregated on any user-defined level of detail, such as per-retailer, per content provider, per content type, per content selection, per transaction terminal, per store, per custom grouping of transaction terminals, per custom grouping of stores, etc. A content provider interface may be provided to the content servers through API 142 or to any content provider account through web interfaces accessible to mobile devices or desktops. The content provider associated with each content server 140 can then search, generate and define reports, and receive predefined reports at content-provider defined intervals for purposes of maintaining proper royalties for its content.

When the transaction manager 115 reports that the transaction with the customer concluded or when an event is detected indicating that the transaction is nearing completion (such as a sensor 114 detecting insertion of a fuel pump handle back into its holster at the terminal 110), the agent 116 terminates the playing of the targeted media selection on display 111. Custom-defined rules may be evaluated by the agent 116 based on the retailer and/or the content provider of the targeted media selection to determine when the targeted media selection is stopped and withdrawn from display 111. For example, one retailer or content provider may have a rule that the targeted media selection is stopped 10 seconds after a fuel pump handle is placed back into its holster; another content provider may have a rule that the targeted media selection is stopped as soon as the fuel pump handle is detected by a sensor 114 as being returned to its holster; and so on. Each retailer and/or content provider can custom define the termination of play rules through API 133 and/or 142 based on any level of detail (media selection identifier, terminal identifier, customer identifier, profile identifier, etc.).

Additionally, play rules can be custom defined for the media selections by the retailer and/or content providers through APIs 133 and/or 142. The customer manager 123 provides the play rules with the profiles to the agent 116. The rules define how the media selections are played on display 111 and can include formatting and/or audio settings. For example, a volume for audio played over speakers of the terminal 110 may in increased for a given media selection; a given media selection is only to play for a given amount of time, a given media selection is to only play on a certain day-of-week or a certain calendar day, a given media selection must play for a given amount of minimal time once initiated regardless of whether the transaction abruptly terminates before all of the selection is done playing.

In fact, the APIs 133 and 142 provide mechanisms for the retailer and/or content provider to control the media selections played, control how each specific media selection is played, control when each specific media selection is stopped on display 111, and control specific log data that is captured by the agent 116 and retained/managed by audit manager 122. This control can be through retailer/content provided defined playback rules, termination rules, and audit/tracking rules.

In an embodiment, the agent 116 also includes imaging processing to determine when the eyes of a customer are looking in the direction of the display 111. The agent 116 records the total amount of time that the customer is looking at the display 111, the number of times the customer looked away from the display 111 and then back at the display 111, and the location within the targeted media selection where facial features of the customer are detected as changing (smiling, laughing, frowning, shaking head). This information is also retailed in the log along with the location within the targeted media selection where the facial features changed. The audit manager 122 maintains such data and can aggregate with all transactions for a given media selection within a given period of time and report through an interface to both the retailer and the content provider. This may allow analysts to determine what works and what does not work in capturing the attention of customers with a given media selection and specific content within that given media selection.

In an embodiment, the media selection is an interactive customer survey.

In an embodiment, the media selection includes a customer-accessible interface for the customer to interact with through the touchscreen display 111.

In an embodiment, the media selection is a movie trailer for a movie that is released.

In an embodiment, the media selection is a combination video with customer-accessible interface. In an embodiment, selection made in the customer-accessible interface during play of a first media selection switches to play of a second different media selection.

In an embodiment, the play rules enforced by agent 116 include rules that cause the agent 116 to switch a first media selection to a second different media selection based on an observed attention of the customer to the first media selection (such as through determining that customer was looking away and inattentive to the first media selection as the first media selection was playing on display 111).

In an embodiment, the media selection is a retailer-produced advertisement.

In an embodiment, the transaction terminal 110 is a fuel pump.

In an embodiment, the transaction terminal is a kiosk.

In an embodiment, the transaction terminal is a digital sign.

In an embodiment, a portion of display 111 is used by the transaction manager 115 for the transaction whereas a second portion of the display 111 is used by agent 116 for playing media selections.

In an embodiment, the terminal 110 includes a separate display for the transaction that is used by the transaction manager 115 from display 111, which is used by agent 116 for playing the media selections.

In an embodiment, the agent 116 requires no API or no programmatic interface for interaction with transaction manager 115; rather operating system (OS) events are registered for detection by agent 116 and display 111 is controlled by agent 116. This allows the system 100 to be deployed without changing any source code or processing associated with transaction manager 115.

In an embodiment, agent 116 uses a same display 111 as transaction manager 115 and has access to the display buffer, such that agent 116 can re-render transaction information being displayed by transaction manager 115 on display 111 so as to not interfere with a media selection being played and rendered on a different portion of the display 111 by the agent 116.

In an embodiment, display 111 is a dedicated display used by agent 116 and a separate transaction terminal display is used by transaction manager 115.

In an embodiment, the media server 120 is a plurality of servers that logically cooperate as a cloud processing environment.

In an embodiment, each content server 140 is a plurality of servers that logically cooperate as a cloud processing environment.

In an embodiment, the content servers 140 are subsumed by and controlled by the retailer servers 130.

In an embodiment, server 120, servers 130, and servers 140 are subsumed and processed as system 100 as a plurality of servers that logically cooperated as a single cloud processing environment.

One now appreciates how the system 100 achieves targeted delivery and play of content (media selections) that can be custom-controlled and tracked by retailers and/or content providers. The start of a media selection's playing is triggered by a presence of a customer at a terminal 110, the media selection can be dynamically switch and specifically tailored to an identified customer, the stopping of the targeted media selection is custom-defined, and statistics regarding the media selection playing are custom captured for tracking and monitoring of each media selection and its success or failure.

These and other embodiments are now discussed with reference to the FIGS. 2-4.

Figure 2:
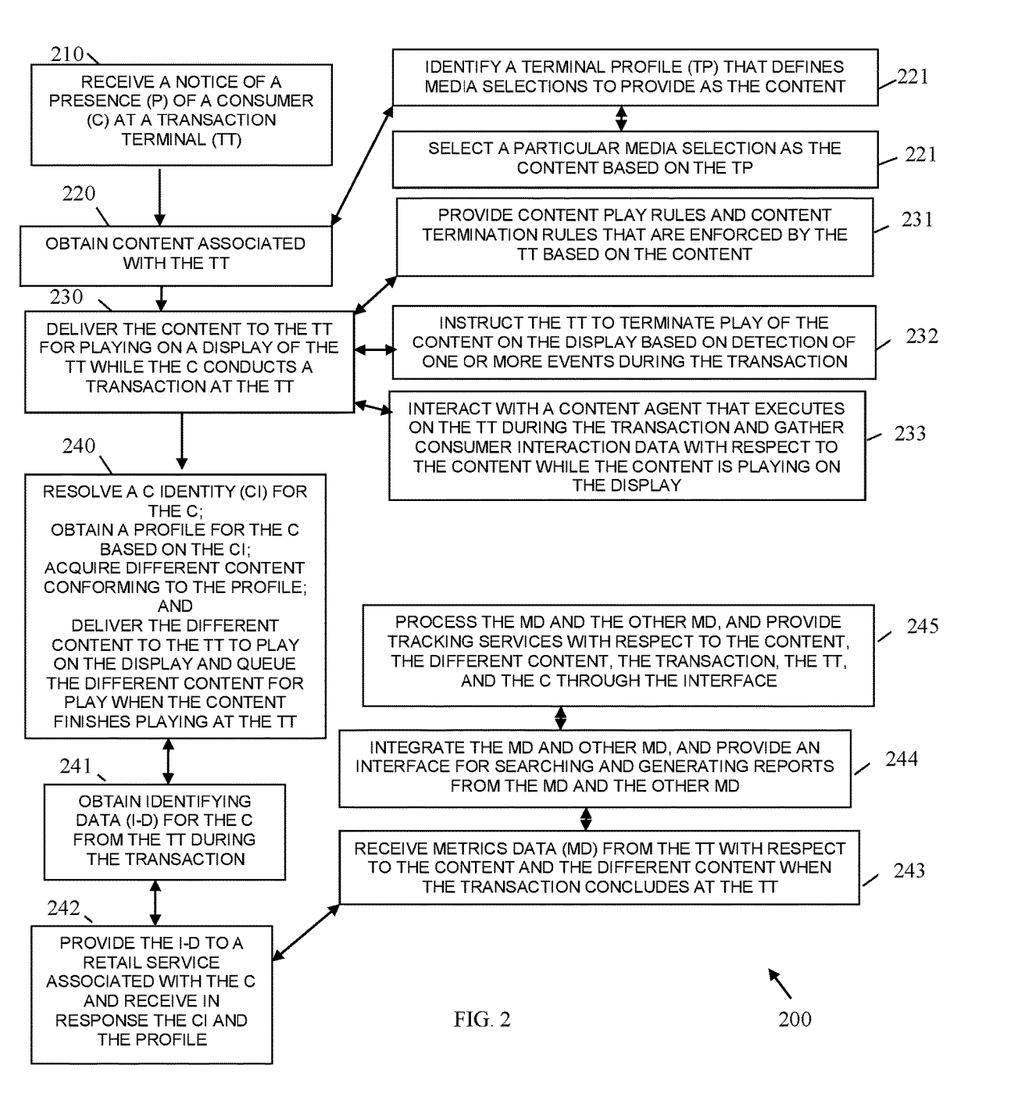
FIG. 2 is a diagram of a method for targeted content delivery, playback, and tracking, according to an example embodiment.

FIG. 2 is a diagram of a method 200 for targeted content delivery, playback, and tracking, according to an example embodiment. The software module(s) that implements the method 200 is referred to as a "targeted media manager." The targeted media manager is implemented as executable instructions programmed and residing within memory and/or a non-transitory computer-readable (processor-readable) storage medium and executed by one or more processors of a device. The processor(s) of the device that executes the targeted media manager are specifically configured and programmed to process the targeted media manager. The device that executes the targeted media manager has access to one or more network connections during its processing. The network connections can be wired, wireless, or a combination of wired and wireless.

In an embodiment, the device that executes the targeted media manager is the media server 120. In an embodiment, the server 120 is part of a cloud-computing environment.

In an embodiment, the targeted media manager is a combination of: 121-123 configured to perform the processing discussed above with the FIG. 1 with respect to media server 120.

At 210, the targeted media manager receives a notice of a presence (physical presence) of a consumer at a transaction terminal.

At 220, the targeted media manager obtains content associated with the transaction terminal.

In an embodiment, at 221, the targeted media manager identifies a terminal profile that defines media selections to provide as the content.

In an embodiment of 221 and at 222, the targeted media manager selects a particular media selection as the content based on the terminal profile.

At 230, the targeted media manager delivers the content to the transaction terminal for playing on a display of the transaction terminal while the consumer conducts a transaction at the transaction terminal.

In an embodiment, at 231, the targeted media manager provides content play rules and content termination rules that are enforced by the transaction terminal based on the content.

In an embodiment, at 232, the targeted media manager instructs the transaction terminal to terminal play of the content on the display based on detection of one or more events during the transaction.

In an embodiment, at 233, the targeted media manager interacts with a content agent that executes on the transaction terminal during the transaction and gathers customer interaction data with respect to the content and while the content is playing on the display of the transaction terminal.

According to an embodiment, at 240, the targeted media manager resolves a consumer identity for the consumer, obtains a profile for the consumer based on the consumer identity, acquires different content conforming to the profile, and delivers the different content to the transaction terminal to play on the display and schedules/queues the different content to play on the display as soon as the original content completes playing on the display of the transaction terminal. It is noted that the original content played may be selected (at least partially) based on its short duration, recognizing that a time it may take to recognize the consumer is likely short. In another case, the targeted media manager may instruct the transaction terminal to abruptly terminate play of the original content and replace the content that is playing on the display of the transaction terminal. The targeted media manager processes play rules with respect to the original content and/or the different content to decide how to instruct the transaction terminal with respect to whether the original content is to play completely before the different content is played or with respect to whether the original content is to be immediately replaced with the different content. The different content is targeted content that is specific to the consumer as defined in the profile and was discussed at length above with the discussion of the FIG. 1.

In an embodiment of 240 and at 241, the targeted media manager obtains the identify data for the consumer from the transaction terminal during the transaction.

In an embodiment of 241 and at 242, the targeted media manager provides the identifying data to a retail service associated with the consumer and receives in response to providing the identifying data, the consumer identity and the profile.

In an embodiment of 242 and at 243, the targeted media manager receives metrics data from the transaction terminal with respect to the content and the different content when the transaction concludes at the transaction terminal.

In an embodiment of 243 and at 244, the targeted media manager integrates the metrics data and other metrics data into a repository. Further, the targeted media manager provides an interface for searching and generating custom reports from the repository having the metrics data and the other metrics data.

In an embodiment of 244 and at 245, the targeted media manager processes the metrics data and the other metrics data within the repository and provides tracking services with respect to the content, the different content, the transaction, the transaction terminal and the consumer through the interface.

Figure 3:
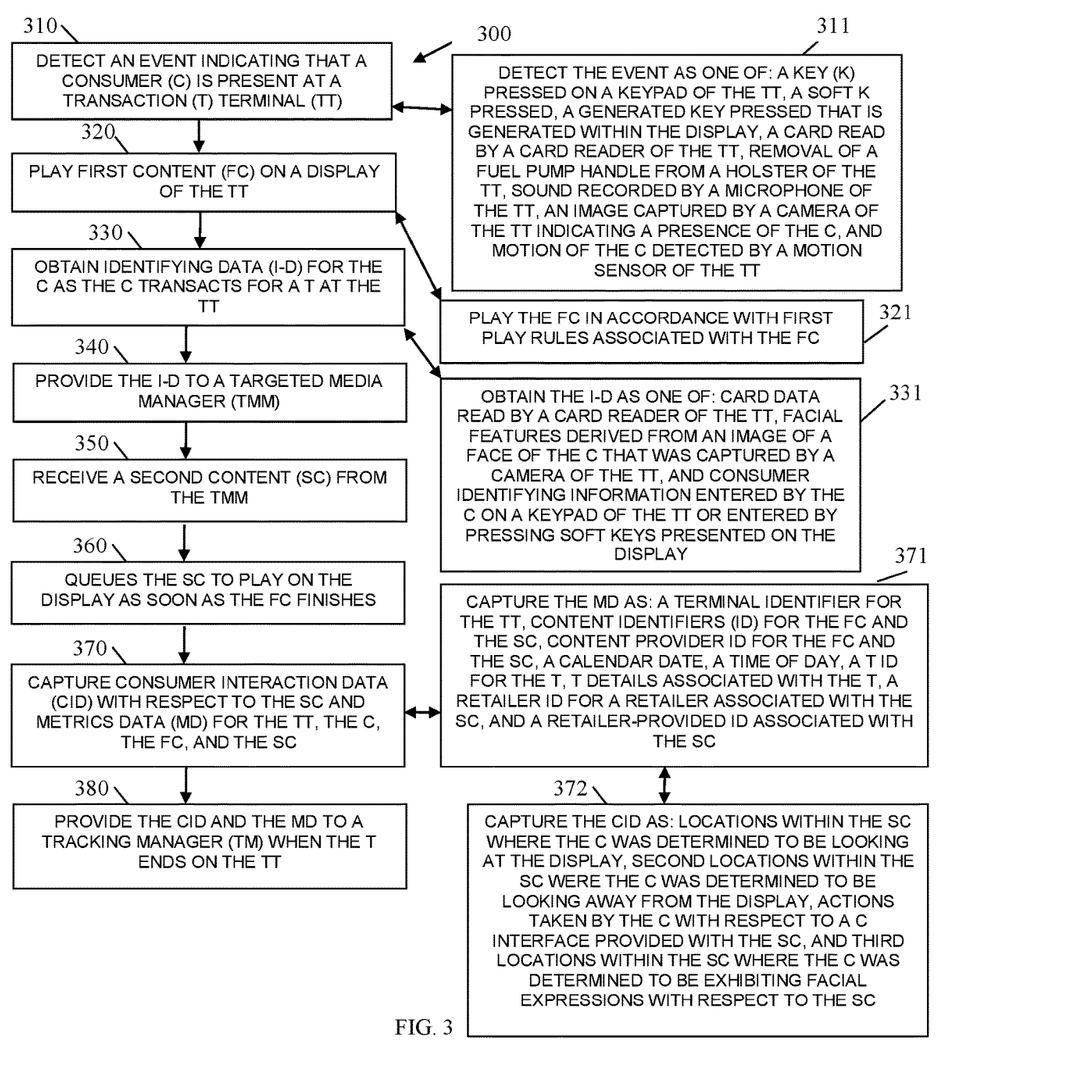
FIG. 3 is a diagram of another method for targeted content delivery, playback, and tracking, according to an example embodiment.

FIG. 3 is a diagram of another method 300 for targeted content delivery, playback, and tracking, according to an example embodiment. The software module(s) that implements the method 300 is referred to as a "targeted media agent." The targeted media agent is implemented as executable instructions programmed and residing within memory and/or a non-transitory computer-readable (processor-readable) storage medium and executed by one or more processors of a device. The processors that execute the targeted media agent are specifically configured and programmed to process the targeted media agent. The device that executes the targeted media agent has access to one or more network connections during its processing. The network connections can be wired, wireless, or a combination of wired and wireless.

In an embodiment, the device that executes the targeted media agent is the transaction terminal 110. In an embodiment, the terminal 110 is one of: an OPT mounted as an independent device inside of a fuel pump, a kiosk, and a digital sign.

In an embodiment, the targeted media agent is the content agent 116 discussed above with the FIG. 1.

In an embodiment, the targeted media agent interacts with the media server 120 and/or the method 200.

At 310, the targeted media agent detects an event indicating that a consumer is physically present at a transaction terminal for a transaction. It is to be noted that the transaction may not be initiated at this time; that is, no official transaction has been started by the consumer. Although in some cases, the transaction may have been initiated at 310.

In an embodiment, at 311, the targeted media agent detects the event as one of: a key pressed on a keypad of the transaction terminal, a soft key pressed associated with the display of the transaction terminal, a generated key that is pressed and that is generated within a display interface of the display, a card read by a card reader of the transaction terminal (card reader can be contactless of content-based), removal of a fuel pump handle from a holster of the transaction terminal, sound recorded by a microphone of the transaction terminal, an image captured by a camera of the transaction terminal that when processed indicates a presence of the consumer, and motion of the consumer detected by a motion sensor of the transaction terminal.

At 320, the targeted media agent plays first content on a display of the transaction terminal for viewing by the consumer while at the transaction terminal.

In an embodiment, at 321, the targeted media agent plays the first content in accordance with first play rules associated with the first content.

At 330, the targeted media agent obtains identifying data for the consumer as the consumer transacts for a transaction at the transaction terminal. At this point, the transaction may have been officially initiated on the transaction terminal by the consumer.

In an embodiment, at 331, the targeted media agent obtains the identifying data as one of: card data read by a card reader (contactless or contact-based) of the transaction terminal, facial features derived from an image of a face of the customer that was captured by a camera of the transaction terminal, and consumer identifying information entered by the consumer on a keypad of the transaction terminal or entered by pressing soft keys presented on the display of the transaction terminal.

At 340, the targeted media agent provides the identifying data to a targeted media manager. In an embodiment, the targeted media manager is the consumer manager 123 and/or the method 200.

At 350, the targeted media agent receives a second content from the targeted media manager.

At 360, the targeted media agent queues the second content to play on the display as soon as the first content finishes playing on the display.

At 370, the targeted media agent captures consumer interaction data with respect to the second content and metrics data for the transaction terminal, the consumer, the first content, and the second content.

In an embodiment, at 371, the targeted media agent captures the metrics data as: a terminal identifier for the transaction terminal, content identifiers for the first content and the second content, content provider identifiers for the first content and the second content, a calendar date for the transaction, a time of day for the transaction, a transaction identifier for the transaction, transaction details associated with the transaction, a retailer identifier for a retailer associated with the second content, and a retailer-provided identifier associated with the second content (such as a marketing campaign identifier, product identifier, service identifier, etc. and as defined by the retailer).

In an embodiment of 371 and at 372, the targeted media agent captures the consumer interaction data as: locations or offset positions within the second content where the consumer was determined to be looking at the display while the second content was playing, second locations or second offset positions within the second content where the consumer was determined to be looking away from the display while the second content was playing, actions taken by the consumer with respect to a consumer interface provided with the second content, and third locations within the second content where the consumer was determined to be exhibiting predefined facial expressions with respect to the second content (achieved through image capture and image processing).

At 380, the targeted media agent provides the consumer interaction data and the metrics data to a tracking manager when the transaction ends on the transaction terminal. In an embodiment, the tracking manager is the audit manager 122 and/or the method 200.

Figure 4:
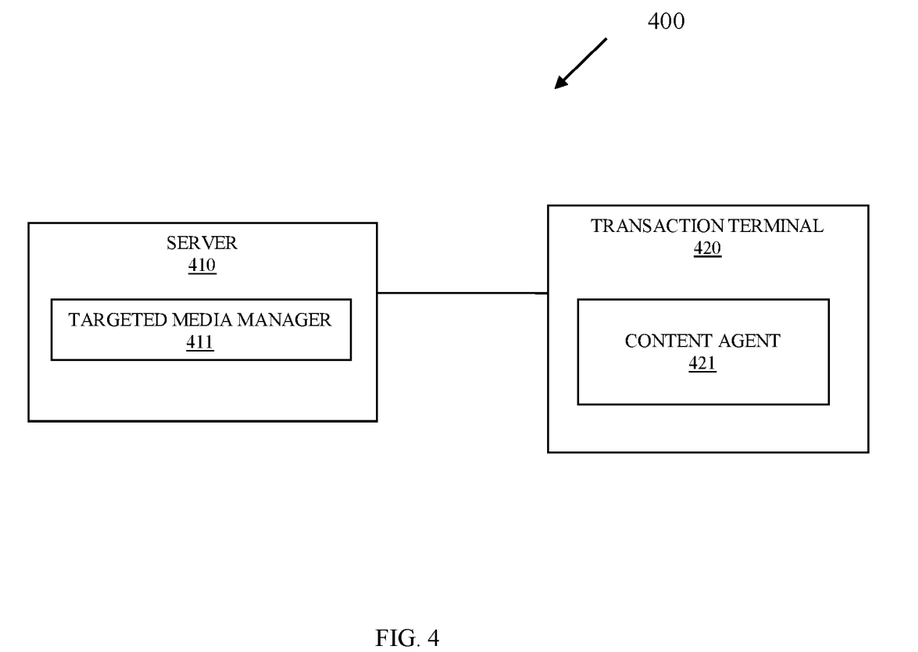
FIG. 4 is a diagram of a system for targeted content delivery, playback, and tracking, according to an example embodiment.

FIG. 4 is a diagram of a system 400 for targeted content delivery, playback, and tracking, according to an example embodiment. The system 400 includes a variety of hardware components and software components. The software components of the system 400 are programmed and reside within memory and/or a non-transitory computer-readable medium and execute on one or more processors of devices associated with system 400. The system 400 communicates over one or more networks, which can be wired, wireless, or a combination of wired and wireless.

In an embodiment, the system 400 implements, inter alia, the processing described above with the FIGS. 1-3.

The system 400 includes a server 410 and a transaction terminal 420. The server 410 includes a targeted media manager 411 and the transaction terminal 420 includes a content agent 421.

The server 410 further includes a processor and non-transitory computer-readable storage media having executable instructions representing the targeted media manager 411. The executable instructions when executed by the server processor from the non-transitory computer-readable storage medium performs the processing described below for the targeted media manager 411.

The transaction terminal 420 further includes a processor and non-transitory computer-readable storage media having executable instructions representing the content agent 421. The executable instructions when executed by the terminal processor from the non-transitory computer-readable storage medium performs the processing described below for the content agent 421.

In an embodiment, the targeted media manager 411 is all or some combination of 121-124 and/or the method 200.

In an embodiment, the content agent 421 is all or some combination of 115-116 and/or the method 300.

The content agent 421 when executed by the terminal processor causes the terminal processor to: 1) detect a presence of a consumer at the transaction terminal 420; 2) report the presence to the targeted media manager 411; 3) play first content according to first rules on a display of the transaction terminal 420 as received from the targeted media manager 411; 4) send identifying data detected for the consumer during a transaction at the transaction terminal 420 to the targeted media manager 411; 5) replace the first content with second content and play the second content according to second rules on the display as received from the targeted media manager 411 in response to sending the identifying data; 6) capture metrics data and user-interaction data while the second content plays on the display; and 7) provide the metrics data and the user-interaction data to the targeted media manager 411 when the transaction ends at the transaction terminal 420.

The targeted media manager 411 when executed by the server processor causes the server processor to: 1) identify and obtain the first content and the first rules based on a terminal profile associated with the transaction terminal 420; 2) provide the first content and the first rules to the content agent 421 upon receipt of the presence from the content agent 421; 3) resolve a consumer identity from the identifying data; 4) obtain a consumer profile based on the consumer identity; 5) obtain the second content and the second rules based on the consumer profile; 6) send the second content and the second rules to the content agent 421; 7) manage the metrics data and the user-interaction data in a repository with other metrics data and other user-interaction data; and 8) provide an interface to the repository, wherein the interface providing access to tracking functions, reporting functions, and auditing functions with respect to the first content and the second content.

In an embodiment, the transaction terminal 420 is a fuel pump kiosk.

In an embodiment, the transaction terminal is one of: an Automated Teller Machine (ATM), a Self-Service Terminal (SST), a Point-Of-Sale (POS) terminal, a kiosk, and a digital sign.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method of operating a system comprising a server and a transaction terminal, the method, comprising:

providing executable instructions to a processor from a non-transitory computer-readable storage medium of the server causing the processor to perform operations, comprising:

receiving notice of a presence of a consumer at the transaction terminal by receiving an event raised by the transaction terminal indicating the presence;

obtaining transaction data as it is identified by and provided from the transaction terminal during a transaction that is being processed on the transaction terminal for the consumer;

providing the transaction data to a retail service as obtained from the transaction terminal by using an Application Programming Interface (API);

obtaining a consumer profile for the consumer and content play rules from the retail service through the API;

providing the consumer profile and the content play rules to an agent of the transaction terminal, wherein the content play rules define how the content is played on a display of the transaction terminal by the agent for viewing by the consumer during the transaction, and wherein the content play rules comprise a format of the content, an amount of time that the content is played on the display of the transaction terminal, whether a given media selection associated with the content is to only play on a certain day of the week or a certain calendar day, and whether the given media selection associated with the content must play for a given amount of time once initiated for play regardless of whether the transaction abruptly terminates before all of the given media selection is finished playing on the display;

dynamically obtaining the content associated with the transaction terminal and specific to the consumer based on the consumer profile from a content server;

delivering the content to the agent of the transaction terminal causing the content to be displayed on the display of the transaction terminal while the consumer conducts the transaction at the transaction terminal by the agent enforcing the content play rules; and controlling other media selections associated with other content displayed on the display of the transaction terminal during other transactions of other consumers through other content play rules through the agent providing second executable instructions to a terminal processor from a terminal non-transitory computer-readable storage medium of the transaction terminal causing the terminal processor to perform operations, comprising raising the event when the presence of the consumer is detected at the transaction terminal;

providing the transaction data for the transaction to the server, wherein the transaction data comprising data unique to the consumer for the server to identify the consumer profile of the consumer;

receiving the consumer profile and the play rules from the server;

processing the agent on the transaction terminal;

providing the consumer profile and the play rules to the agent;

receiving the content from the server;

providing the content to the agent; and displaying, by the agent, the content on the display of the transaction terminal while the consumer conducts the transaction at the transaction terminal with the agent enforcing the content play rules.

2. The method of claim 1 further comprising:

acquiring different content conforming to the profile; and delivering the different content to the agent of the transaction terminal to play on the display and queueing the different content for play when the content finishes playing at the transaction terminal.

3. The method of claim 2, wherein acquiring the different content further includes obtaining identifying data for the consumer from the transaction data during the transaction.

4. The method of claim 3 further comprising, receiving metrics data from the agent of the transaction terminal with respect to the content and the different content when the transaction concludes at the transaction terminal.

5. The method of claim 4 further comprising, integrating the metrics data with other metrics data and providing an interface for searching and generating reports from the metrics data and the other metrics data.

6. The method of claim 5, wherein integrating further includes processing the metrics data and the other metrics data, and providing tracking services with respect to the content, the different content, the transaction, the transaction terminal, and the consumer through the interface.

7. The method of claim 1, wherein obtaining the transaction data further includes identifying a terminal profile that defines media selections to provide as the content.

8. The method of claim 7, wherein identifying further includes selecting a particular media selection as the content based on the consumer profile.

9. The method of claim 1, wherein delivering further includes providing content termination rules that are enforced by the agent of the transaction terminal based on the content.

10. The method of claim 1, wherein delivering further includes instructing the agent of the transaction terminal to terminate play of the content on the display based on detection of one or more other events during the transaction.

11. The method of claim 1, wherein delivering further includes interacting with the agent during the transaction and gathering consumer interaction data with respect to the content while the content is playing on the display.

12. A method of a system comprising a server and a transaction terminal, the method, comprising:

providing executable instructions to a processor from a non-transitory computer-readable storage medium of the transaction terminal causing the processor to perform operations, comprising:

detecting an event indicating that a consumer is present at the transaction terminal;

raising the event to the server;

playing first content on a display of the transaction terminal based on the event detected;

obtaining identifying data for the consumer as the consumer transacts for a transaction at the transaction terminal by identifying the identifying data from transaction data associated with the transaction being processed on the transaction terminal;

providing the identifying data to a targeted media manager of the server during the transaction as the identifying data is produced at the transaction terminal;
receiving a second content from the targeted media manager of the server;
receiving content play rules associated with the second content from the targeted media manager of the server, wherein the content play rules comprise a format of the second content, an amount of time that the second content is played on the display of the transaction terminal, whether a given media selection associated with the second content is to only play on a certain day of the week or a certain calendar day, and whether the given media selection associated with the second content must play for a given amount of time once initiated for play regardless of whether the transaction abruptly terminates before all of the given media selection is finished playing on the display;
replacing the first content with the second content and playing the second content on the display during the transaction by enforcing the content play rules;
capturing consumer interaction data with respect to the second content and metrics data for the transaction terminal, the consumer, the first content, and the second content;
providing the consumer interaction data and the metrics data to a tracking manager of the server when the transaction ends on the transaction terminal;
controlling other media selections associated with other content displayed on the display of the transaction terminal during other transactions of other consumers through other content play rules;
providing second executable instructions to a server processor from a server non-transitory computer-readable storage medium of the server causing the processor to perform operations, comprising:
identifying the event raised by the transaction terminal;
providing the first content to the transaction terminal based on the event;
processing a targeted media manager on the server;
receiving, by the targeted media manager, the identifying data;
obtaining, by the targeted media manager, the second content based on the identifying data;
obtaining, by the targeted media manager, the content play rules based on the identifying data of the consumer;
sending, by the targeted media manager, the second content and the content play rules to the transaction terminal; and
receiving, by the targeted media manager, the consumer interaction data and the metrics.

13. The method of claim 12, wherein detecting the event includes detecting the event as one of: a key pressed on a keypad of the transaction terminal, a soft key pressed associated with the display, a generated key that is pressed and generated within a display interface of the display, a card read by a card reader of the transaction terminal, removal of a fuel pump handle from a holster of the transaction terminal, sound recorded by a microphone of the transaction terminal, an image captured by a camera of the transaction terminal indicating a presence of the consumer, and motion of the consumer detected by a motion sensor of the transaction terminal.

14. The method of claim 12, wherein playing further includes playing the first content in accordance with transaction-terminal play rules associated with the first content of the transaction terminal.

15. The method of claim 12, wherein obtaining further includes obtaining the identifying data as one of: card data read by a card reader of the transaction terminal, facial features derived from an image of a face of the consumer that was captured by a camera of the transaction terminal, and consumer identifying information entered by the consumer on a keypad of the transaction terminal or entered by pressing soft keys presented on the display.

16. The method of claim 12, wherein capturing further includes capturing the metrics data as: a terminal identifier for the transaction terminal, content identifiers for the first content and the second content, content provider identifiers for the first content and the second content, a calendar date, a time of day, a transaction identifier for the transaction, transaction details associated with the transaction, a retailer identifier for a retailer associated with the second content, and a retailer-provided identifier associated with the second content.

17. The method of claim 16, wherein capturing further includes capturing the consumer interaction data as: locations within the second content where the consumer was determined to be looking at the display, second locations within the second content where the consumer was determined to be looking away from the display, actions taken by the consumer with respect to a consumer interface provided with the second content, and third locations within the second content where the consumer was determined to be exhibiting facial expressions with respect to the second content.

18. A system, comprising:
a server comprising a processor and a non-transitory computer-readable storage medium having executable instructions representing a targeted media manager;
a transaction terminal comprising a terminal processor and a terminal non-transitory computer-readable storage medium having terminal executable instructions representing a content agent;
the content agent executed by the terminal processor from the terminal non-transitory computer-readable storage medium causing the terminal processor to perform operations comprising:
detecting a presence of a consumer at the transaction terminal;
report the presence to the targeted media manager of the server;
playing first content according to first content play rules on a display of the transaction terminal as received from the targeted media manager of the server and provided by the targeted media manager based on a transaction terminal profile linked to a transaction terminal identifier for the transaction terminal;
sending identifying data detected for the consumer during a transaction at the transaction terminal to the targeted media manager of the server as the identifying data is obtained from transaction data produced by the transaction terminal during processing of the transaction;
replacing the first content with second content and play the second content according to second content play rules on the display as received from the targeted media manager of the server in response to sending the identifying data and playing the second content on the display by enforcing the second content play rules, wherein the target media manager provides the second content and the second content play rules based on the identifying data sent during the transaction, wherein the second content play rules comprise a format of the second content, an amount of time that the second content is played on the display of the transaction terminal, whether a given media selection associated with the second content is to only play on a certain day of the week or a certain calendar day, and whether the given media selection associated with the second content must play for a given amount of time once initiated for play regardless of whether the transaction abruptly terminates before all of the given media selection is finished playing on the display;

capturing metrics data and user-interaction data associated with consumer interactions with the second content as the second content plays on the display; and providing the metrics data and the user-interaction data to the targeted media manager of the server when the transaction ends at the transaction terminal; and the targeted media manager executed by the processor from the non-transitory computer-readable storage medium causes the processor to perform additional operations comprising:

receiving the presence from the content agent of the transaction terminal;

identifying and obtaining the first content and the first content play rules based on the transaction terminal profile associated with the transaction terminal using the transaction terminal identifier associated with the content agent;

providing the first content and the first content play rules to the content agent;

obtaining a consumer profile based on providing the identifying data received from the content agent to a retail service and receiving in response the consumer profile and the second content play rules;

obtaining the second content based on the consumer profile from a content server;

sending the second content and the second content play rules to the content agent;

managing the metrics data and the user-interaction data in a repository with other metrics data and other user-interaction data;

providing an interface to the repository, wherein the interface providing access to tracking functions, reporting functions, and auditing functions with respect to the first content and the second content; and controlling other media selections associated with other content displayed on the display of the transaction terminal during other transactions of other consumers through other content play rules through the content agent.

19. The system of claim 18, wherein the transaction terminal is a Self-Service Terminal (SST), an Automated Teller Machine (ATM), a kiosk, a Point-Of-Sale (POS) terminal, and an Outdoor Payment Terminal (OPT) that is an independent device mounted inside a fuel pump, or a digital sign.

\* \* \* \* \*